United States Patent
Harada (10) Patent No.: US 11,571,870 B2
(45) Date of Patent: Feb. 7, 2023

(54) PRESS MACHINE AND METHOD FOR MONITORING ABNORMALITY OF PRESS MACHINE

(71) Applicant: AIDA ENGINEERING, LTD., Kanagawa (JP)

(72) Inventor: Yasuhiro Harada, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 691 days.

(21) Appl. No.: 16/598,549

(22) Filed: Oct. 10, 2019

(65) Prior Publication Data

US 2020/0114608 A1 Apr. 16, 2020

(30) Foreign Application Priority Data

Oct. 16, 2018 (JP) .............................. JP2018-194837

(51) Int. Cl.
*G06N 20/00* (2019.01)
*B30B 15/00* (2006.01)
*G07C 3/14* (2006.01)

(52) U.S. Cl.
CPC ......... *B30B 15/0094* (2013.01); *G06N 20/00* (2019.01); *G07C 3/14* (2013.01)

(58) Field of Classification Search
CPC ....... B30B 15/0094; G06N 20/00; G07C 3/14
See application file for complete search history.

(56) References Cited

U.S. PATENT DOCUMENTS

| 10,082,774 | B2* | 9/2018 | Leonard | ................... G06F 17/18 |
| 11,307,117 | B2* | 4/2022 | Thirani | .............. G05B 23/0283 |
| 2013/0156875 | A1 | 6/2013 | Maruyama et al. | |

(Continued)

FOREIGN PATENT DOCUMENTS

| CN | 103171108 A | 6/2013 |
| CN | 106409120 A | 2/2017 |

(Continued)

OTHER PUBLICATIONS

European Office Action issued in the corresponding European Patent Application No. 19203356.1, dated Mar. 17, 2021.

(Continued)

*Primary Examiner* — Elias Desta
(74) *Attorney, Agent, or Firm* — McDermott Will & Emery LLP (57) ABSTRACT

A press machine includes: a learning-model generating unit that uses one data from among data collected from sensors, as an objective variable, and uses data other than the one data as an explanatory variable to perform machine learning to generate a learning model for the one data, the generation being performed for all the data; a predicted-value calculating unit that inputs an actually measured value of data other than one data from among the data collected from the sensors, into the learning model for the one data to calculate a predicted value of the one data, the calculation being performed for all the data; a degree-of-abnormality calculating unit that calculates a degree of abnormality based on a difference between an actually measured value and a predicted value of the data; and a degree-of-abnormality outputting unit that outputs the calculated degree of abnormality.

7 Claims, 6 Drawing Sheets

(56) References Cited

U.S. PATENT DOCUMENTS

| | | | |
|---|---|---|---|
| 2017/0031329 A1 | 2/2017 | Inagaki et al. | |
| 2017/0036261 A1 | 2/2017 | Iwakuro et al. | |
| 2017/0220008 A1 | 8/2017 | Takahashi et al. | |
| 2017/0357243 A1 | 12/2017 | Takayama et al. | |
| 2017/0368413 A1* | 12/2017 | Shavit .................. | A61B 5/1123 |
| 2018/0164768 A1 | 6/2018 | Kawanoue | |
| 2018/0164781 A1 | 6/2018 | Kubo et al. | |
| 2019/0265657 A1 | 8/2019 | Inagaki et al. | |
| 2022/0146993 A1 | 5/2022 | Inagaki et al. | |

FOREIGN PATENT DOCUMENTS

| | | |
|---|---|---|
| CN | 107024917 A | 8/2017 |
| CN | 107491038 A | 12/2017 |
| CN | 108227603 A | 6/2018 |
| CN | 108227633 A | 6/2018 |
| DE | 102016008987 A1 | 2/2017 |
| DE | 102018000579 A1 | 7/2018 |
| EP | 3379360 A2 | 9/2018 |
| JP | 2017-019016 A | 1/2017 |
| WO | 2017/191872 A1 | 11/2017 |

OTHER PUBLICATIONS

Extended European Search Report issued in corresponding European Patent Application No. 19203356.1, dated Mar. 16, 2020.
European Office Action dated Nov. 18, 2020 issued in corresponding European Patent Application No. 19203356.1.
First Office Action issued in the corresponding Chinese Patent Application No. 201910978500.5 dated Aug. 29, 2022, With English Translation.

* cited by examiner

| DATA | CORRELATION COEFFICIENT |
|---|---|
| POSITIONAL DEVIATION | −0.827 |
| INPUT CURRENT TO SERVO POWER SUPPLY | −0.022 |
| OUTPUT CURRENT OF SERVO AMPLIFIER | 0.957 |
| SPEED DEVIATION | −0.783 |
| TEMPERATURE OF SERVO POWER SUPPLY | 0.645 |
| VOLTAGE ACROSS PN | 0.983 |

ACTUALLY MEASURED VALUE

| TIME | VOLTAGE ACROSS PN | OUTPUT CURRENT OF SERVO AMPLIFIER | PRESS LOAD | TEMPERATURE OF SERVO POWER SUPPLY | ... |
|---|---|---|---|---|---|
| 00:00:00 | 120 | 200 | 1560 | 42 | ... |
| 00:00:01 | 110 | 180 | 1540 | 40 | ... |
| 00:00:02 | 50 | 100 | 1200 | 38 | ... |
| 00:00:03 | 20 | 51 | 50 | 32 | ... |
| 00:00:04 | 100 | 195 | 1620 | 39 | ... |
| 00:00:05 | 118 | 213 | 1530 | 41 | ... |

PREDICTED VALUE

| TIME | VOLTAGE ACROSS PN | OUTPUT CURRENT OF SERVO AMPLIFIER | PRESS LOAD | TEMPERATURE OF SERVO POWER SUPPLY | ... |
|---|---|---|---|---|---|
| 00:00:05 | 122 | 199 | 1592 | 39 | ... |

PRESS MACHINE AND METHOD FOR MONITORING ABNORMALITY OF PRESS MACHINE

Japanese Patent Application No. 2018-194837, filed on Oct. 16, 2018, is hereby incorporated by reference in its entirety.

BACKGROUND

The present invention relates to a press machine and a method for monitoring an abnormality of a press machine.

JP-A-2017-19016 discloses a mold abnormality prediction system that uses an AE sensor for detecting an elastic wave generated in a machining portion of a mold and a press load sensor for detecting a press load to predict occurrence of abnormality of the mold.

The mold abnormality prediction system described above only predicts the occurrence of a specific abnormality (abnormality of a mold) from among various abnormalities that may occur in a press machine, and is difficult to comprehensively predict occurrence of abnormalities.

SUMMARY

The invention may provide a press machine and an abnormality monitoring method for a press machine, which makes it possible to easily find a sign of failure.

According to a first aspect of the invention, there is provided a press machine including:

a learning-model generating unit that uses one data from among a plurality of data collected from a plurality of sensors provided in the press machine, as an objective variable, and uses data other than the one data as an explanatory variable to perform machine learning to generate a learning model for the one data, the generation being performed for all of the plurality of data;

a predicted-value calculating unit that inputs an actually measured value of data other than one data from among the plurality of data collected from the plurality of sensors, into the learning model for the one data to calculate a predicted value of the one data, the calculation being performed for all of the plurality of data;

a degree-of-abnormality calculating unit that calculates a degree of abnormality based on a difference between an actually measured value and a predicted value of the plurality of data; and a degree-of-abnormality outputting unit configured to output the calculated degree of abnormality.

According to a second aspect of the invention, there is provided a method for monitoring an abnormality of a press machine including:

using one data from among a plurality of data collected from a plurality of sensors provided in the press machine, as an objective variable, and also using data other than the one data as an explanatory variable to perform machine learning to generate a learning model for the one data, the generation being performed for all of the plurality of data;

inputting an actually measured value of data other than one data from among the plurality of data collected from the plurality of sensors, into the learning model for the one data to calculate a predicted value of the one data, the calculation being performed for all of the plurality of data;

calculating a degree of abnormality based on a difference between an actually measured value and a predicted value of the plurality of data; and outputting the calculated degree of abnormality.

DESCRIPTION OF EMBODIMENTS (1) According to an embodiment of the invention, there is provided a press machine including:

a learning-model generating unit that uses one data from among a plurality of data collected from a plurality of sensors provided in the press machine, as an objective variable, and uses data other than the one data as an explanatory variable to perform machine learning to generate a learning model for the one data, the generation being performed for all of the plurality of data;

a predicted-value calculating unit that inputs an actually measured value of data other than one data from among the plurality of data collected from the plurality of sensors, into the learning model for the one data to calculate a predicted value of the one data, the calculation being performed for all of the plurality of data;

a degree-of-abnormality calculating unit that calculates a degree of abnormality based on a difference between an actually measured value and a predicted value of the plurality of data; and a degree-of-abnormality outputting unit that outputs the calculated degree of abnormality.

According to an embodiment of the invention, there is provided a method for monitoring an abnormality of a press machine including:

using one data from among a plurality of data collected from a plurality of sensors provided in the press machine, as an objective variable, and also using data other than the one data as an explanatory variable to generate a learning model for the one data, the generation being performed for all of the plurality of data;

inputting an actually measured value of data other than one data from among the plurality of data collected from the plurality of sensors, into the learning model for the one data to calculate a predicted value of the one data, the calculation being performed for all of the plurality of data;

calculating a degree of abnormality based on a difference between an actually measured value and a predicted value of the plurality of data; and outputting the calculated degree of abnormality.

According to the embodiments above, it is possible to easily find a sign of failure of a press machine, by: performing machine learning using a plurality of data collected from a plurality of sensors to generate a learning model for each data; using the plurality of data collected from the plurality of sensors and also using the learning model for each of the data to calculate a predicted value of each of the data, and calculating the degree of abnormality based on a difference between an actually measured value and a predicted value of the plurality of data.

(2) In the press machine described above, the press machine may be a servo press, and the plurality of data may include data on a press load and data on output current of a servo amplifier.

(3) In the press machine described above, the learning-model generating unit may use one data from among the plurality of data collected from the plurality of sensors, data on a positional deviation, and data on a speed deviation, as an objective variable, and also may use data other than the one data as an explanatory variable to perform machine learning to generate a learning model for the one data, the generation being performed for all of the plurality of data, the data on the positional deviation, and the data on the speed deviation;

the predicted-value calculating unit may input an actually measured value of data other than the one data from among the plurality of data collected from the plurality of sensors, the data on the positional deviation, and the data on the speed deviation, into the learning model for the one data to calculate a predicted value of the one data, the calculation being performed for all of the plurality of data, the data on the positional deviation, and the data on the speed deviation, and the degree-of-abnormality calculating unit may calculate a degree of abnormality based on a difference between an actually measured value and a predicted value of the plurality of data, the data on the positional deviation, and the data on the speed deviation.

(4) In the press machine described above, the plurality of data may include at least one of data on input current to a servo power supply, data on voltage across PN, data on a temperature of the servo power supply, data on a temperature of a servo amplifier, and data on a temperature of a capacitor.

Embodiments of the invention will be described in detail below, with reference to the drawings.

First Embodiment

Figure 1:
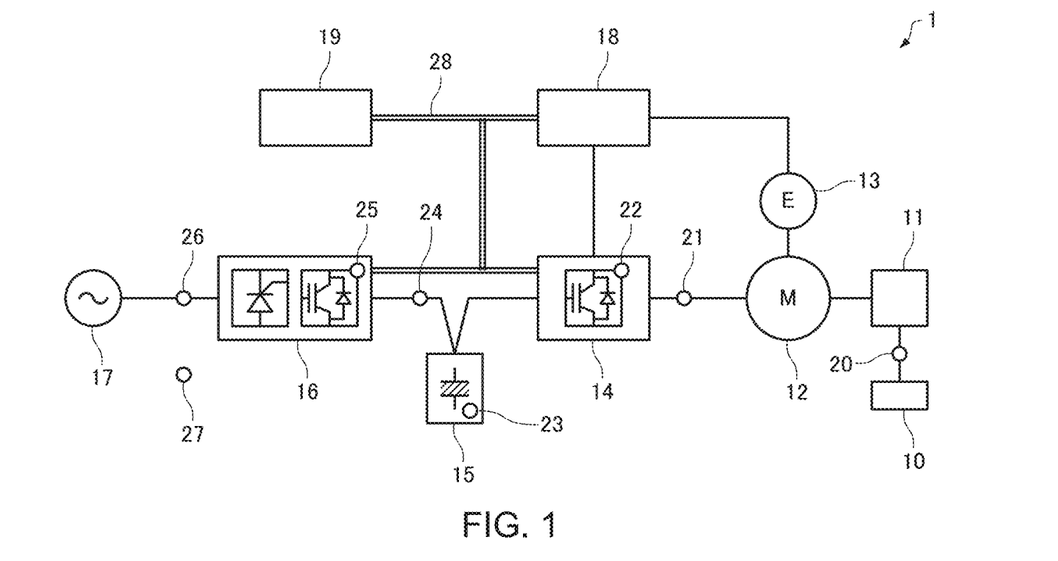
FIG. 1 is a diagram schematically illustrating an example of a configuration of a press machine according to a first embodiment.

FIG. 1 is a diagram schematically illustrating one example of a configuration of a press machine according to the first embodiment. The press machine according to the first embodiment is a servo press.

A press machine 1 includes: a slide 10 that can move up and down; a drive mechanism 11 (for example, a crank shaft and a connecting rod) for driving the slide 10; a servo motor 12 that drives the drive mechanism 11; a motor encoder 13 that detects a rotational position of the servo motor 12; a servo amplifier 14 that supplies current to the servo motor 12; a capacitor 15 (energy storing device); a servo power supply 16 that supplies current to the serve amplifier 14 and the capacitor 15; an alternating current power supply 17 that supplies AC electric power to the servo power supply 16; a servo controller 18 that controls the servo amplifier 14; and an information processing device 19.

The servo controller 18 generates an instruction as to a rotational speed for the servo motor 12 according to a deviation (positional deviation) between the instruction as to a rotational position and a position signal from the motor encoder 13, and outputs an instruction as to current to the servo amplifier 14 according to a deviation (speed deviation) between the generated instruction as to a rotational speed and a speed signal (speed signal calculated based on the position signal).

The press machine 1 also includes a plurality of sensors. In the example illustrated in FIG. 1, the press machine 1 includes: a sensor 20 that detects a press load; a sensor 21 that detects an output current (secondary current) of the servo amplifier 14; a sensor 22 that detects a temperature (IGBT temperature) of the servo amplifier 14; a sensor 23 that detects a temperature of the capacitor 15; a sensor 24 that detects a voltage across PN (voltage across the capacitor 15); a sensor 25 that detects a temperature (IGBT temperature) of the servo power supply 16; a sensor 26 that detects the input current (primary current) to the servo power supply 16; and a sensor 27 that detects an ambient temperature. Here, as for the sensor 20, a strain gauge attached to the column (side frame) of the press machine may be used, or a load cell provided in the hydraulic pressure chamber in the slide 10 may be used. In a case where a strain gauge is used as the sensor 20, the strain gauge may be attached to each of the right and left columns. In addition, as for the sensor 23, a sensor that detects a temperature of a balance resistor connected to the capacitor 15 may be used. Data from the sensors 20 to 27 are collected by each of the control units (the servo controller 18, the servo amplifier 14, and the servo power supply 16) at every predetermined time interval, and each of the control units sends the collected data to the information processing device 19 via a network 28 such as LAN at every predetermined time interval. Furthermore, the servo controller 18 sends data on a positional deviation and data on a speed deviation to the information processing device 19 at every predetermined time interval. Note that, as for data on a temperature of the servo amplifier 14, it may be possible to use a difference between the temperature detected by the sensor 22 and the ambient temperature (temperature detected by the sensor 27) as a temperature of the servo amplifier 14. Similarly, as for the temperature of the capacitor 15, it may be possible to use a difference between the temperature detected by the sensor 23 and the ambient temperature as the temperature of the capacitor 15, and as for the temperature of the servo power supply 16, it may be possible to use a difference between the temperature detected by the sensor 25 and the ambient temperature as the temperature of the servo power supply 16.

Figure 2:
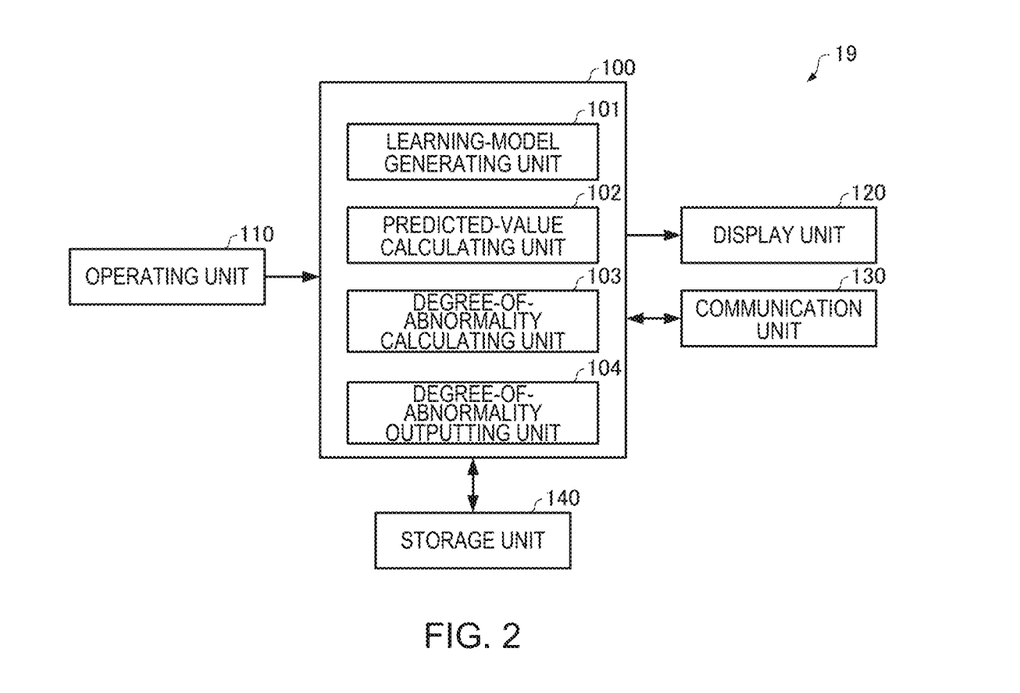
FIG. 2 is a functional block diagram illustrating a configuration of an information processing device.

FIG. 2 is a functional block diagram illustrating a configuration of the information processing device 19. The information processing device 19 includes a processing unit 100, an operation unit 110, a display unit 120, a communication unit 130, and a storage unit 140.

The operation unit 110 is used to input the operation information by a user, and outputs the inputted operation information to the processing unit 100. Functions of the operation unit 110 may be achieved with hardware such as a keyboard, a mouse, a button, a touch panel, a touch pad, or the like.

The display unit 120 is used to display an image generated by the processing unit 100, and functions thereof may be achieved with an LCD, a CRT, a touch panel that also functions as the operating unit 110, or the like.

The communication unit 130 is used to perform various types of control for performing communication with each of the control units (the servo controller 18, the servo amplifier 14, and the servo power supply 16), and functions thereof may be achieved with hardware such as various types of processor and an ASIC for communication, programs, or the like.

The storage unit 140 stores programs and various types of data for causing a computer to function as each unit of the processing unit 100 and also functions as a work region of the processing unit 100, and functions thereof may be achieved with a hard disk, an RAM, or the like. The storage unit 140 stores the data collected from the sensors 20 to 27 and the servo controller 18 (the data from the sensors 20 to 27, the data on the positional deviation, and the data on the speed deviation) during a certain period of time (learning period) at the time of normal operation, in a manner such that the data are associated with time information.

Functions of the processing unit 100 (computer) may be achieved with hardware such as various types of processors (CPU, DSP, and the like) or a program. The processing unit 100 includes a learning-model generating unit 101, a predicted-value calculating unit 102, a degree-of-abnormality calculate unit 103, and a degree-of-abnormality outputting unit 104.

The learning-model generating unit 101 uses, as an objective variable, one data from among the data (a plurality of data collected from the sensors 20 to 27, the data on a positional deviation, and the data on a speed deviation) stored in the storage unit 140, and uses data other than the one data as an explanatory variable to perform machine learning to generate a learning model for the one data, the generation being performed for all of the plurality of data, the data on a positional deviation, and the data on a speed deviation. A neural network is used for the algorithm of machine learning. However, it may be possible to use any analysis technique suitable for the correlated data.

The predicted-value calculating unit 102 inputs an actually measured value of data other than one data of the plurality of data collected from the sensors 20 to 27, the data on a positional deviation collected from the servo controller 18, and the data on a speed deviation, into a learning model for the one data to calculate a predicted value of the one data, the calculation being performed for all of the plurality of data, the data on a positional deviation, and the data on a speed deviation.

The degree-of-abnormality calculating unit 103 calculates the degree of abnormality based on a difference between an actually measured value of the plurality of data, the data on a positional deviation and the data on a speed deviation, and a predicted value of each of these data.

The degree-of-abnormality outputting unit 104 outputs the degree of abnormality calculated by the degree-of-abnormality calculating unit 103. For example, the degree-of-abnormality outputting unit 104 may cause the display unit 120 to display the calculated degree of abnormality, or may transmit information on the calculated degree of abnormality to other information processing devices or servers. Furthermore, in a case where the calculated degree of abnormality exceeds a predetermined threshold, the degree-of-abnormality outputting unit 104 may cause the display unit 120 to display warning information (alert), or may transmit the warning information to other information processing devices or servers.

Figure 3:
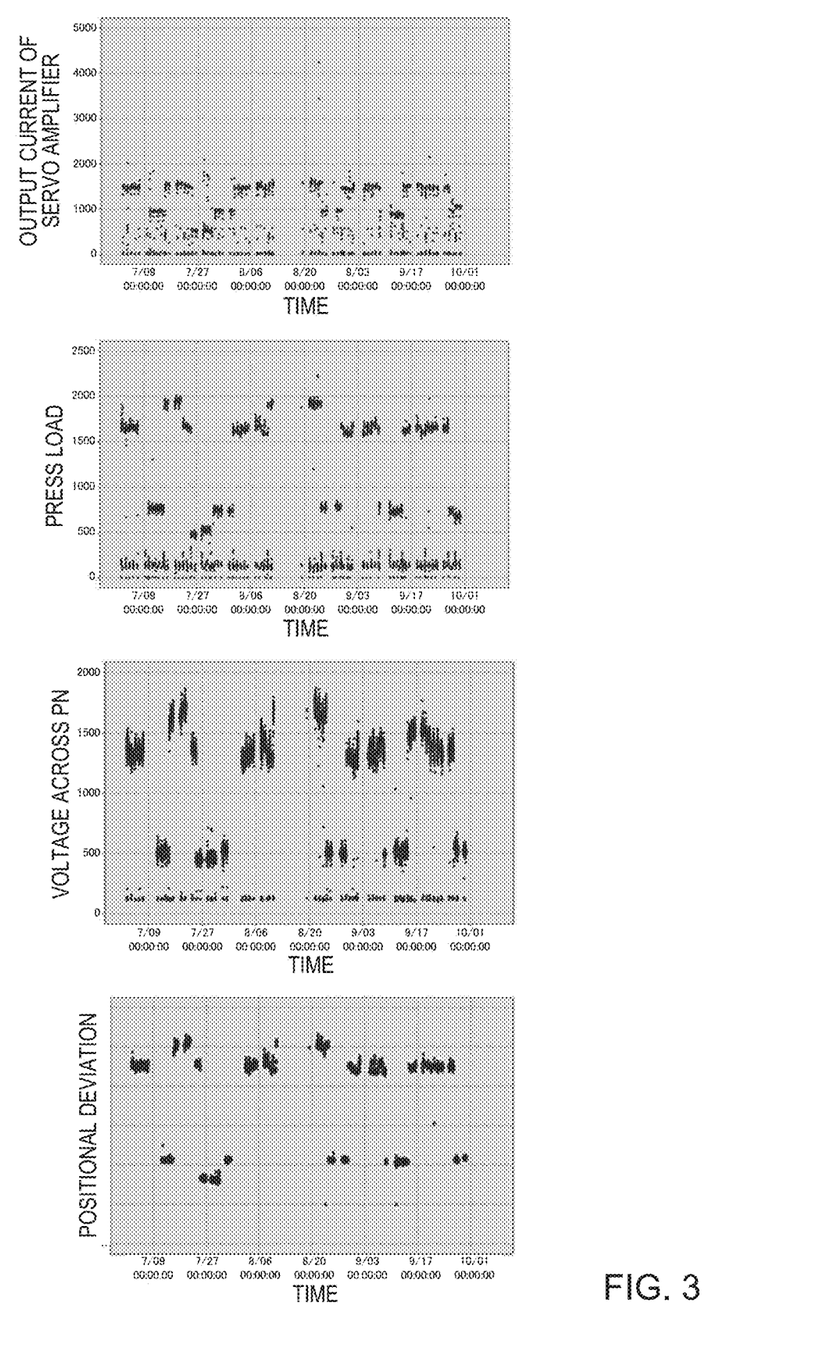
FIG. 3 illustrates correlation between collected data.

FIG. 3 illustrates correlations between collected data. FIG. 3 illustrates graphs in which the maximum values during one shot of the output current of the servo amplifier 14 detected by the sensor 21, the press load detected by the sensor 20, the voltage across PN detected by the sensor 24, and the positional deviation calculated by the servo controller 18 are plotted over several months. From FIG. 3, it is apparent that there are correlations between the output current of the servo amplifier 14, the press load, the voltage across PN, and the positional deviation.

Figure 4:
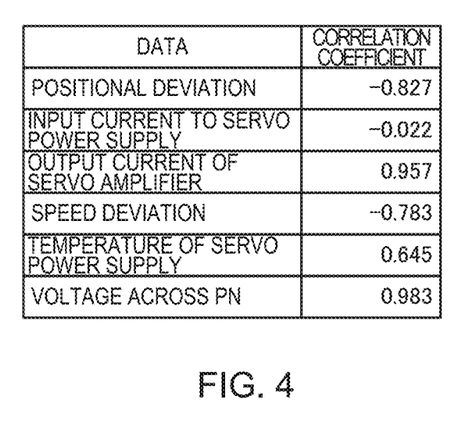
FIG. 4 is a table illustrating the correlation coefficient between data on a press load and other collected data.

FIG. 4 is a table illustrating a correlation coefficient (Pearson's product moment correlation coefficient) between data on a press load (maximum load) detected by the sensor 20 and other collected data (a positional deviation, an input current to the servo power supply 16, an output current of the servo amplifier 14, a speed deviation, a temperature (difference from the ambient temperature) of the servo power supply 16, and a voltage across PN). From FIG. 4, it can be understood that there are strong correlations between the press load and the positional deviation, between the press load and the output current of the servo amplifier 14, between the press load and the speed deviation, and between the press load and the voltage across PN.

The first embodiment focuses on the fact that there are correlations between the collected data including the plurality of data collected from the plurality of sensors that the press machine include, the data on a positional deviation, and the data on a speed deviation, and performs machine learning for all of the collected data to generate a learning model for each of the data. For example, at the time of generating a learning model for the data on a press load, the data on a press load is used as an objective variable, and all of the collected data except for the press load are used as an explanatory variable to generate a learning model. In addition, at the time of generating a learning model for the data on a positional deviation, the data on a positional deviation is used as an objective variable, and all of the collected data except for the positional deviation are used as an explanatory variable to generate a learning model. After this, learning models are similarly generated for the other data. Press machines continuously keep producing the same product. Thus, data under the same conditions can be easily accumulated, and it is possible to easily generate highly precise learning models.

Figure 5:
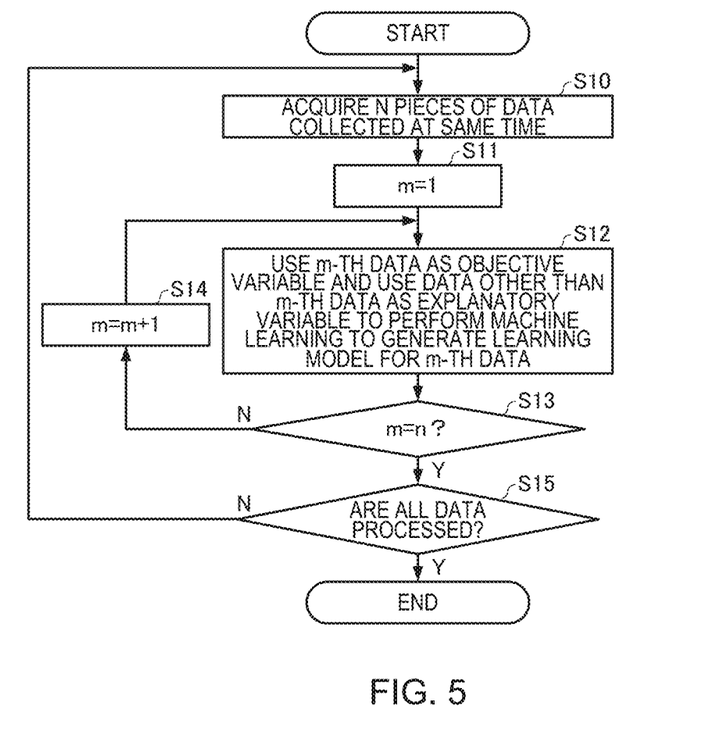
FIG. 5 is a flowchart illustrating a flow of a process for generating a learning model.

FIG. 5 is a flowchart illustrating the flow of a process of generating a learning model. First, the learning-model generating unit 101 acquires n pieces of data (data from the sensors 20 to 27, data on a positional deviation, and data on a speed deviation) collected at the same time from among data collected in a learning period and stored in the storage unit 140 (step S10), and sets "1" as a variation m (step S11). Next, the learning-model generating unit 101 uses, as an objective variable, the m-th data from among then pieces of acquired data and also uses, as an explanatory variable, (n−1) pieces of data other than the m-th data to perform machine learning to generate (update) the learning model for the m-th data (step S12). After this, the learning-model generating unit 101 determines whether the variable m has reached n (the learning model has been generated or updated for all of the n pieces of data) (step S13). If the variable m has not reached n (N in step S13), "1" is added to the variable m (step S14) to proceed to step S12, and the processes in steps S12 to S14 are repeated until the variable m reaches n. If the variable m reaches n in step S13), the learning-model generating unit 101 determines whether all data collected during the learning period have been processed (step S15). If all of the data have not been processed (Y in step S15), the process moves to step S10 to acquire the n pieces of data collected at the next time, and then repeats the processes in steps S10 to S15 until all of the data collected during the learning period have been processed.

Then, the first embodiment uses the learning model for each of the data to calculate the predicted value of one data based on the actually measured values of all other data. For example, at the time of calculating a predicted value of the data of a press load, actually measured values of all of the data except for the press load are input into the learning model for a press load, and the thus obtained value is used as the predicted value of the data on a press load. At the time of calculating a predicted value of the data on a positional deviation, actually measured values of all of the data except for the positional deviation are input into the learning model for a positional deviation, and the thus obtained value is used as the predicted value of the data on a positional deviation. After this, predicted values of the other data are similarly calculated.

Figure 6:
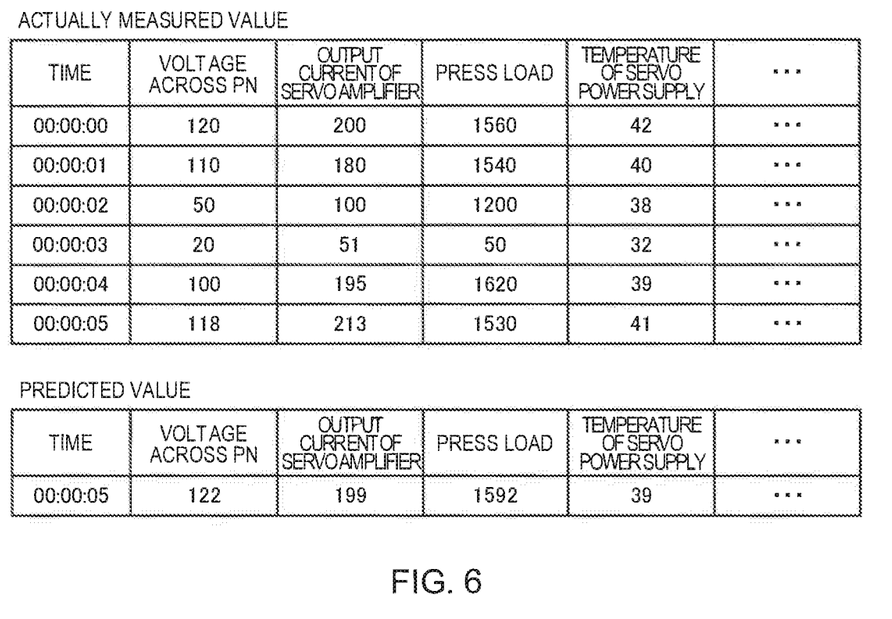
FIG. 6 illustrates an example of actually measured values and an example of calculation of predicted values.

FIG. 6 illustrates an example of actually measured values and an example of calculation of predicted values. These examples show actually measured values of respective data such as voltages across PN, output currents of the servo amplifier 14, press loads, and temperatures of the servo power supply 16 during a period from "00:00:00" to "00:00:05," and also show predicted values of respective data calculated based on the actually measured values of the respective data at the time of "00:00:05." For example, the predicted value "122" of the voltage across PN is calculated based on the actually measured value "213" of the output current, the actually measured value "1530" of the press load, the actually measured value "41" of the temperature, and the like. In addition, the predicted value "199" of the output current is calculated based on the actually measured value "118" of the voltage across PN, the actually measured value "1530" of the press load, the actually measured value "41" of the temperature, and the like.

Next, the first embodiment calculates a difference between the actually measured value and the predicted value of each of the data, and the calculated differences are each multiplied by a weight to add up the differences to calculate the degree of abnormality. For example, the degree of abnormality Da can be calculated through the following equation:

$$Da = \sum_{m=1}^{n} \{K_m \times |(Act_m - Prd_m)|\}$$

Here, $Act_m$ represents an actually measured value of the m-th data from among the n pieces of collected data. $Prd_m$ represents a predicted value of the m-th data. $K_m$ represents a weight (coefficient of degree of abnormality) to be multiplied by a difference between the actually measured value and the predicted value of the m-th data. The value of the coefficient $K_m$ of degree of abnormality may be a constant or a variable (for example, reciprocal of the actually measured value $Act_m$).

For example, in the example illustrated in FIG. 6, assuming that only four types of data on the voltage across PN, the output current, the press load, and the temperature of the servo power supply are collected, and the value of the coefficient $K_m$ of degree of abnormality is "1," a difference between the actually measured value and the predicted value of the voltage across PN at the time of "00:00:05" is "4," a difference between the actually measured value and the predicted value of the output current is "14," a difference between the actually measured value and the predicted value of the press load is "62," and a difference between the actually measured value and the predicted value of the temperature of the servo power supply is "2," and hence, the degree of abnormality Da at the time of "00:00:05" is a value "82" which is a value obtained by adding up these differences.

In a range where the value Da of the degree of abnormality is lower the difference between the actually measured value and the predicted value is smaller), conditions do not change from the learning period, and the correlation of the learning model is maintained, and hence, it can be understood that operation is highly likely to be normal. On the other hand, as the value of the degree of abnormality Da increases (i.e., the difference between the actually measured value and the predicted value becomes larger), conditions differ from the learning period, and the correlation of the learning model will be degraded, and hence, it can be seen that there is a sign of failure or a failure is likely to is actually occur.

Thus, according to the first embodiment, it is possible to easily find a sign of failure of a press machine, by: performing machine learning using a plurality of data collected from a plurality of sensors collected during the learning period, positional deviations, and data on a speed deviation to generate a learning model for each of the data; then calculating the predicted value of each of the data using the collected data and the learning model for each of the data during a self-diagnosis period; and calculating the degree of abnormality based on the differences between the actually measured value and the predicted value of the collected data.

Figure 7:
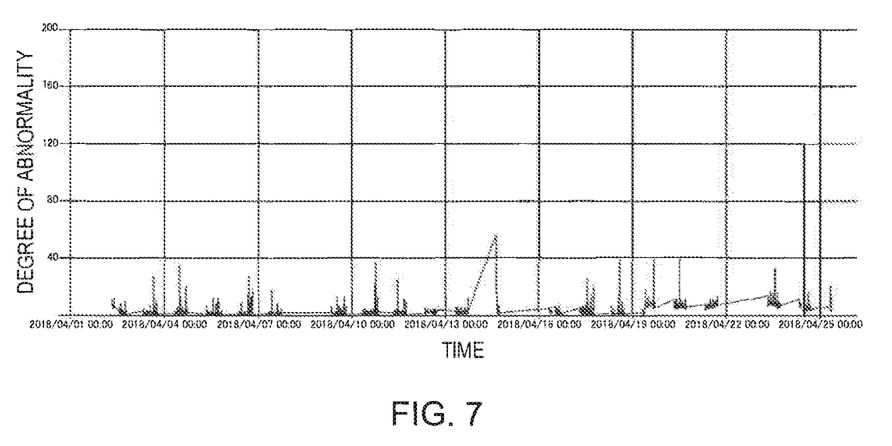
FIG. 7 illustrates an example of display of a degree of abnormality.

FIG. 7 illustrates an example of indication of the degree of abnormality. This example shows the degree of abnormality using a graph in which the horizontal axis represents time and the vertical axis represents the degree of abnormality. A user does not need to narrow down a monitoring target from all of the collected data, and it is only necessary to monitor only the degree of abnormality. In addition, even if differences between the actually measured value and the predicted value are small, differences between the actually measured value and the predicted value of a large pieces of data are added together, and are indicated as a degree of abnormality, and hence, it can be said that this is a method of indication suitable to finding a sign of failure. Note that, in addition to the degree of abnormality, it may be possible to output (display) several pieces of top-ranked differences between the actually measured value and the predicted value from among the collected data. This makes it easier to estimate (or identify) the cause of the failure.

Figure 8:
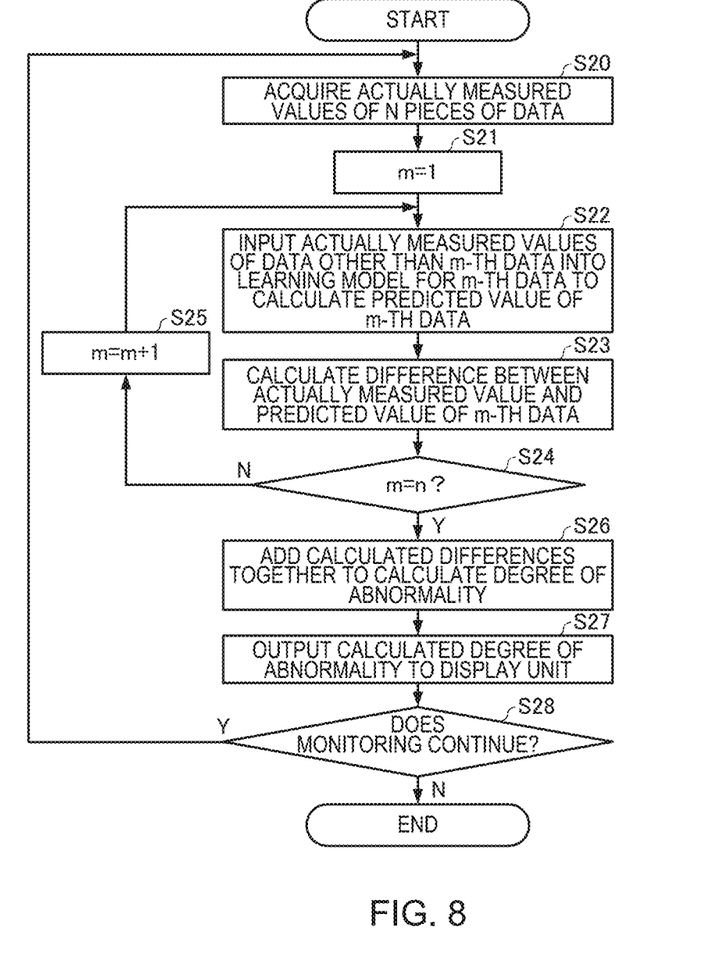
FIG. 8 is a flowchart illustrating a flow of a process for calculating a degree of abnormality.

FIG. 8 is a flowchart illustrating the flow of a process for calculating the degree of abnormality. First, the predicted-value calculating unit 102 acquires actually measured values of then pieces of collected data (data from the sensors 20 to 27, data on a positional deviation, and data on a speed deviation) (step S20), and sets "1" as the variable m (step S21). Next, the predicted-value calculating unit 102 inputs actually measured values of data other than the m-th data from among the n pieces of acquired data, into the learning model for the m-th data to calculate a predicted value of the m-th data (step S22). Then, the degree-of-abnormality calculating unit 103 calculates a difference between the actually measured value of the m-th data and the predicted value of the m-th data (step S23). After this, the degree-of-abnormality calculating unit 103 determines whether the variable m has reached n (the predicted value has been calculated for all of the n pieces of data) (step S24). In a case where the variable m does not reach n (N in step S24), "1" is added to the variable m (step S25), and the process moves to step S22 to repeat processes in steps S22 to S25 until the variable m reaches n. In a case where the variable m reaches n (Y in step S24), the degree-of-abnormality calculating unit 103 multiplies the n pieces of differences calculated in step S23 by a weight and adds them together to calculate the degree of abnormality (step S26). Next, the degree-of-abnormality outputting unit 104 outputs the calculated degree of abnormality to the display unit 120 (step S27). Then, the processing unit 100 determines whether to continue monitoring (whether it is in a self-diagnosis period) (step S28). In a case where monitoring continues (Y in step S28), the process proceeds to step S20 to acquire the n pieces of the collected data, and after this, processes in steps S20 to S28 are repeated until the self-diagnosis period ends.

Next, a working example of prediction of occurrence of failure based on the degree of abnormality will be described using an example in which cracking occurs in a frame of a press machine. Here, it is assumed that the press load detected by the sensor 20 (strain gauge), the positional deviation sent from the servo controller 18, and the output current detected by the sensor 21 are acquired as the collected data.

In a case where the same products are being produced during normal operation, the same pressing performance, torque capability, and work capacity are required. Thus, the press load, the positional deviation, and the output current are kept at constant values, and the correlations between these three are constant. Thus, the degree of abnormality calculated during this time are indicated to be low values.

Here, in a case of a sign phase where cracking occurs in a frame, for example, in a case where a small crack starts to occur in a left column, this causes an imbalance between values of strain gauges attached to the right column and the left column, which leads to detection of values different from the normal operation. Furthermore, due to unstable pressing force, the torque required to molding fluctuates, which has an impact on the output current. The instability of pressing force and output current has an effect on the servo control, which causes the deviation of position, which have been kept at an instructed position, to fluctuate.

As the correlations between the collected data are maintained during the normal operation, the actually measured value and the predicted value of each of the data are close to each other, and the degree of abnormality remains low. In the sign phase of a failure, however, these correlations collapse, which results in a deviation between the actually measured value and the predicted value, and an increase in the degree of abnormality. By monitoring a change in the degree of abnormality as described above, it is possible to rapidly find a sign of failure.

Second Embodiment

Figure 9:
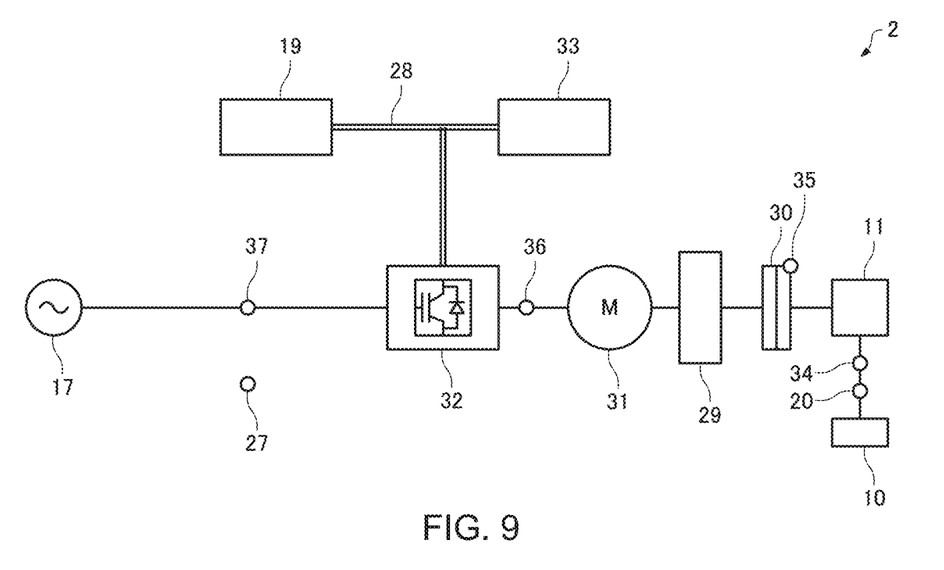
FIG. 9 is a diagram schematically illustrating an example of a configuration of a press machine according to a second embodiment.

FIG. 9 is a diagram schematically illustrating an example of the configuration of a press machine according to the second embodiment. The press machine according to the second embodiment is a mechanical press (mechanical-type press). In FIG. 9, components similar to those in FIG. 1 are given the same reference signs, and descriptions thereof will be omitted as appropriate.

A press machine 2 includes: a slide 10 that can move up and down; a drive mechanism 11 for driving the slide 10; a flywheel 29 that drives the drive mechanism 11; a clutch and brake 30 including a clutch that engages and releases the flywheel 29 with the drive mechanism 11 and a brake that brakes rotation of a rotating body of the drive mechanism 11; an induction motor 31 that causes the flywheel 29 to rotate; an inverter 32 that supplies the induction motor 31 with current; an AC power supply 17 that supplies the inverter 32 with AC electric power; a press controller 33 that, for example, controls the clutch and brake 30; and the information processing device 19.

The press machine 2 also includes a plurality of sensors. In the example illustrated in FIG. 9, the press machine 2 includes: the sensor 20 that detects a press load, a sensor 34 that detects the temperature of the lubricating oil; a sensor 35 that detects the temperature of the clutch and brake 30; a sensor 36 that detects an output current (secondary current) of the inverter 32; a sensor 37 that detects an input current (primary current) to the inverter 32; and the sensor 27 that detects the ambient temperature. Data from the sensors 20, 27, and 34 to 37 are collected by each of the control units (the inverter 32 and the press controller 33) at every predetermined time interval, and each of the control units sends the collected data to the information processing device 19 via the network 28 at every predetermined time interval.

The learning-model generating unit 101 of the information processing device 19 uses, as an objective variable, one data from among a plurality of data collected from the sensors 20, 27, and 34 to 37 during a learning period and also uses data other than the one data as an explanatory variable to perform machine learning to generate a learning model for the one data, the generation being performed for all of the plurality of data. The predicted-value calculating unit 102 inputs, during a self-diagnosis period, an actually measured value of data other than the one data from among the plurality of data collected from the sensors 20, 27, and 34 to 37 into the learning model for the one data to calculate a predicted value of the one data, the calculation being performed for all of the plurality of data. The degree-of-abnormality calculating unit 103 calculates a degree of abnormality based on a difference between the actually measured value of the plurality of data and the predicted value thereof.

According to the second embodiment, it is also possible to achieve an effect similar to that of the first embodiment and to easily find a sign of a failure of the press machine.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:
1. A press machine comprising:
   a plurality of sensors collecting n pieces of correlated data;
   a learning-model generating unit configured to, for each of the n pieces of correlated data, use one piece of correlated data as an objective variable, and use all other n−1 pieces of correlated data as an explanatory variable to perform machine learning to generate a learning model for the one piece of correlated data;
   a predicted-value calculating unit configured to, for each of the n pieces of correlated data, calculate a predicted value of the one piece of correlated data by inputting actually measured values of all other n−1 pieces of correlated data into the learning model for the one piece of correlated data;
   a degree-of-abnormality calculating unit configured to calculate a degree of abnormality as a weighted sum of differences between the actually measured values and the predicted values of each of the n pieces of correlated data; and a degree-of-abnormality outputting unit configured to output the calculated degree of abnormality.

2. The press machine according to claim 1, wherein
the press machine is a servo press, and
the n pieces of correlated data include data on a press load and data on output current of a servo amplifier.

3. The press machine according to claim 2, wherein
the n pieces of correlated data include at least one of data on input current to a servo power supply, data on voltage across PN, data on a temperature of the servo power supply, data on a temperature of a servo amplifier, and data on a temperature of a capacitor.

4. The press machine according to claim 2, wherein the n pieces of correlated data include at least one of data on input current to a servo power supply, data on voltage across PN, data on a temperature of the servo power supply, data on a temperature of a servo amplifier, and data on a temperature of a capacitor, data on an ambient temperature, and data on a temperature of a lubricating oil.

5. The press machine according to claim 1, wherein
the press machine is a mechanical press; and
the n pieces of correlated data include data on a press load and data on an output current of an inverter.

6. The press machine according to claim 5, wherein the n pieces of correlated data include at least one of data on an ambient temperature, data on a temperature of lubricating oil, and data on a temperature of a clutch and brake.

7. A method for monitoring an abnormality of a press machine, comprising:
- collecting n pieces of correlated data by a plurality of sensors;
- for each of the n pieces of correlated data, using one piece of correlated data as an objective variable, and using all other n−1 pieces of correlated data as an explanatory variable to perform machine learning to generate a learning model for the one piece of correlated data;
- for each of the n pieces of correlated data, calculating a predicted value of the one piece of correlated data by inputting actually measured values of all other n−1 pieces of correlated data into the learning model for the one piece of correlated data;
- calculating a degree of abnormality as a weighted sum of differences between the actually measured values and the predicted values of each of the n pieces of correlated data; and
- outputting the calculated degree of abnormality.

* * * * *